(12) United States Patent
Liu et al.

(10) Patent No.: US 10,750,396 B2
(45) Date of Patent: *Aug. 18, 2020

(54) SYSTEMS AND METHODS FOR REFERENCE SIGNALS AND CSI FEEDBACK

(71) Applicant: Futurewei Technologies, Inc., Plano, TX (US)

(72) Inventors: Jialing Liu, Palatine, IL (US); Weimin Xiao, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 77 days.

This patent is subject to a terminal disclaimer.

(21) Appl. No.: 15/978,444

(22) Filed: May 14, 2018

(65) Prior Publication Data
US 2018/0262938 A1 Sep. 13, 2018

Related U.S. Application Data

(63) Continuation of application No. 13/800,504, filed on Mar. 13, 2013, now Pat. No. 9,973,955.
(Continued)

(51) Int. Cl.
*H04W 24/10* (2009.01)
*H04B 7/06* (2006.01)

(52) U.S. Cl.
CPC .......... *H04W 24/10* (2013.01); *H04B 7/0619* (2013.01); *H04B 7/0626* (2013.01); *H04B 7/0632* (2013.01)

(58) Field of Classification Search
CPC .... H04B 7/024; H04B 7/0615; H04B 7/0619; H04B 7/0626; H04B 7/0632; H04B 7/0691; H04W 24/10; H04W 72/1231
See application file for complete search history.

(56) References Cited

U.S. PATENT DOCUMENTS

| 8,644,827 B2 | 2/2014 | Yamada et al. |
| 8,937,929 B2 | 1/2015 | Abe et al. |

(Continued)

FOREIGN PATENT DOCUMENTS

| CA | 2815965 A1 | 5/2012 |
| CN | 101877865 A | 11/2010 |

(Continued)

OTHER PUBLICATIONS

Renesas Mobile Europe Ltd., "Interference measurements for Release 11", 3GPP TSG-RAN WG1 Meeting #67, San Francisco, USA, R1-113893, Nov. 14-18, 2011, 5 pages.

(Continued)

*Primary Examiner* — Habte Mered
*Assistant Examiner* — Prince A Mensah
(74) *Attorney, Agent, or Firm* — Slater Matsil, LLP

(57) ABSTRACT

System and method embodiments are provided for signaling reference signals and Channel State Information (CSI) feedback for wireless communications. An embodiment method implemented by a user equipment (UE) for wireless communications measurements and CSI feedback includes receiving, from a network, at least one of a first index that indicates a corresponding non-zero-power CSI reference signal (CSI-RS) resource, a second index that indicates a corresponding zero-power CSI-RS resource, a third index that indicates a corresponding CSI-RS resource for interference measurement, and a fourth index that indicates a corresponding channel quality indicator (CQI) report configuration. The method also includes receiving, from the network, at least one of a fifth index that indicates a corresponding periodic CQI report in accordance with the CQI report configuration indicated by the fourth index, and a sixth index that indicates a corresponding aperiodic CQI (Continued)

report in accordance with the CQI report configuration indicated by the fourth index.

37 Claims, 8 Drawing Sheets

Related U.S. Application Data

(60) Provisional application No. 61/612,062, filed on Mar. 16, 2012.

(56) References Cited

U.S. PATENT DOCUMENTS

| | | | |
|---|---|---|---|
| 8,989,114 B2 | 3/2015 | Kim et al. | |
| 9,137,811 B2 | 9/2015 | Huang et al. | |
| 9,167,448 B2 | 10/2015 | Nagata et al. | |
| 2011/0243066 A1 | 10/2011 | Nayeb Nazar et al. | |
| 2012/0039282 A1 | 2/2012 | Kim et al. | |
| 2012/0134275 A1* | 5/2012 | Choi | H04L 1/0026 370/241 |
| 2012/0140708 A1 | 6/2012 | Choudhury et al. | |
| 2012/0213261 A1* | 8/2012 | Sayana | H04L 5/0048 375/224 |
| 2012/0281554 A1 | 11/2012 | Gao | |
| 2012/0287875 A1 | 11/2012 | Kim et al. | |
| 2012/0315859 A1 | 12/2012 | Lee et al. | |
| 2013/0039199 A1 | 2/2013 | Liao | |
| 2013/0114430 A1 | 5/2013 | Koivisto | |
| 2013/0176978 A1 | 7/2013 | Abe et al. | |
| 2013/0182648 A1 | 7/2013 | Abe et al. | |
| 2013/0196675 A1 | 8/2013 | Xiao et al. | |
| 2015/0036639 A1 | 2/2015 | Kwak et al. | |

FOREIGN PATENT DOCUMENTS

| | | |
|---|---|---|
| CN | 102377469 A | 3/2012 |
| EP | 2640113 A1 | 11/2011 |
| EP | 2418894 A1 | 2/2012 |
| EP | 2541982 A1 | 1/2013 |
| JP | 2011259494 A | 12/2011 |
| JP | 2012005073 A | 1/2012 |
| JP | 1897918 B1 | 3/2012 |
| JP | 2012044322 A | 3/2012 |
| JP | 2012044323 A | 3/2012 |
| JP | 2014529945 A | 11/2014 |
| RU | 2426236 C2 | 8/2011 |
| WO | 2011115421 A2 | 9/2011 |
| WO | 2011124064 A1 | 10/2011 |
| WO | 2013025558 A1 | 2/2013 |

OTHER PUBLICATIONS

Qualcomm Incorporated, "Framework for DL CoMP CSI test", 3GPP TSG-RAN WG4 #66, R4-133071, Malta, Jan. 28-Feb. 1, 2013, 7 pages.
Qualcomm Incorporated, "Signaling and Configuration of CSI-RS," 3GPP TSG-RAN WG1 #62, R1-104797, Madrid Spain, Aug. 23-27, 2010, 7 pages.
Intel Corporation, "DL Control Signaling for DL CoMP," 3GPP TSG-RAN WG1 #67, R1-113937, San Francisco, Nov. 14-18, 2011, 4 pages.
"3rd Generation Partnership Project; Technical Specification Group Radio Access Network; Evolved Universal Terrestrial Radio Access (E-UTRA); Physical Channels and Modulation (Release 11)," 3GPP TS 36.211, V11.1.0, Dec. 2012, 108 pages.
"3rd Generation Partnership Project; Technical Specification Group Radio Access Network; Evolved Universal Terrestrial Radio Access (E-UTRA); Physical layer procedures (Release 11)," 3GPP TS 36.213, V11.1.0, Dec. 2012, 160 pages.
LTE, "3rd Generation Partnership Project; Technical Specification Group Radio Access Network; Evolved Universal Terrestrial Radio Access (E-UTRA); Physical Layer Procedures (Release 10)," 3GPP TS 36.213 v10.5.0, Mar. 2012, 125 pages.
"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331, V11.2.0, Dec. 2012, 340 pages.
LTE, "3rd Generation Partnership Project; Technical Specification Group Radio Access Network; Evolved Universal Terrestrial Radio Access (E-UTRA); Radio Resource Control (RRC); Protocol Specification (Release 10)," 3GPP TS 36.331 v10.5.0, Mar. 2012, 302 pages.
"Overview of 3GPP Release 10," 3GPP, V0.1.10, Sep. 2013, 144 pages.

* cited by examiner

300

SYSTEMS AND METHODS FOR REFERENCE SIGNALS AND CSI FEEDBACK

PRIORITY CLAIM AND CROSS-REFERENCE

This application is a continuation of U.S. patent application Ser. No. 13/800,504 filed on Mar. 13, 2013 and entitled "Systems and Methods for Reference Signals and CSI Feedback," which application claims the benefit of U.S. Provisional Application No. 61/612,062 filed on Mar. 16, 2012 and entitled "System and Method for Reference Signals and CSI Feedback," which are hereby incorporated herein by reference as if reproduced in their entirety.

TECHNICAL FIELD

The present invention relates to the field of wireless communications, and, in particular embodiments, to a system and method for reference signals and CSI Feedback.

BACKGROUND

Present and future wireless communication systems include LTE, LTE-A and LTE-A-beyond systems. Measurements and Channel State Information (CSI) feedback are one focus area in LTE-A studies. Measurements and CSI feedback are typically based on various reference signals (RSs). In downlink transmission of LTE-A system, there are reference signals for user equipment (UE) to perform channel/signal estimation/measurements for demodulation of Physical downlink control channel (PDCCH) and other common channels, as well as for some measurements and feedbacks. The reference signals include the Common/Cell-specific Reference Signal (CRS) inherited from the Rel-8/9 specification of E-UTRA. A dedicated/demodulation reference signal (DMRS) can be transmitted together with the Physical downlink shared channel (PDSCH) in Rel-10 of E-UTRA. The DMRS is used for channel estimation during PDSCH demodulation.

In Rel-10, Channel Status Indication Reference Signal (CSI-RS) is introduced in addition to CRS and DMRS. CSI-RS is used for Rel-10 UEs to measure the channel status, e.g., for multiple antennas cases. Precoding Matrix indicator (PMI)/channel quantity indicator (CQI)/rank indicator (RI) and other feedbacks may be based on the measurement of CSI-RS for Rel-10 and beyond UE. The PMI is the precoding Matrix indicator, and the CQI is channel quantity indicator, and the RI is rank indicator of the precoding matrix. The CSI-RS in Rel-10 can support up to 8 transmission antennas while the CRS can only support up to 4 transmission antennas in Rel-8/9. The number of CSI-RS antenna ports can be 1, 2, 4, or 8. In addition, to support the same number of antenna ports, the CSI-RS has less overhead due to its low density in time and frequency.

SUMMARY

In accordance with an embodiment, a method implemented by a user equipment (UE) for wireless communications measurements and Channel State Information (CSI) feedback includes receiving, from a network, at least one of a first index that indicates a corresponding non-zero-power CSI reference signal (CSI-RS) resource, a second index that indicates a corresponding zero-power CSI-RS resource, a third index that indicates a corresponding CSI-RS resource for interference measurement, and a fourth index that indicates a corresponding channel quality indicator (CQI) report configuration.

In another embodiment, a method implemented by a network component for configuring a UE for wireless communications measurements and CSI feedback includes transmitting, to the UE, at least one of a first index that indicates a corresponding non-zero-power CSI-RS resource, a second index that indicates a corresponding zero-power CSI-RS resource, a third index that indicates a corresponding CSI-RS resource for interference measurement, and a fourth index that indicates a corresponding CQI report.

In another embodiment, a UE configured for wireless communications measurements and CSI feedback includes a processor and a computer readable storage medium storing programming for execution by the processor. The programming includes instructions to receive, from a network, at least one of a first index that indicates a corresponding non-zero-power CSI-RS resource, a second index that indicates a corresponding zero-power CSI-RS resource, a third index that indicates a corresponding CSI-RS resource for interference measurement, and a fourth index that indicates a corresponding CQI report.

In yet another embodiment, a network component for configuring a UE for wireless communications measurements and CSI feedback includes a processor and a computer readable storage medium storing programming for execution by the processor. The programming includes instructions to transmit, to the UE, at least one of a first index that indicates a corresponding non-zero-power CSI-RS resource, a second index that indicates a corresponding zero-power CSI-RS resource, a third index that indicates a corresponding CSI-RS resource for interference measurement, and a fourth index that indicates a corresponding CQI report.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In Orthogonal frequency-division multiplexing (OFDM) systems, the frequency bandwidth is divided into multiple subcarriers in frequency domain. In time domain, one subframe is divided into multiple OFDM symbols. The OFDM symbol may have cyclic prefix to avoid the inter-symbol interference due to multiple path delays. One resource element is defined by the time-frequency resource within one subcarrier and one OFDM symbol. A reference signal and other signals, such as data channel PDSCH and control channel PDCCH, are orthogonal and multiplexed in different resource elements in time-frequency domain. Further, the signals are modulated and mapped into resource elements. Using inverse Fourier transform per each OFDM symbol, the signals in frequency domain are transformed into the signals in time domain, and are transmitted with added cyclic prefix to avoid the inter-symbol interference.

Figure 1:
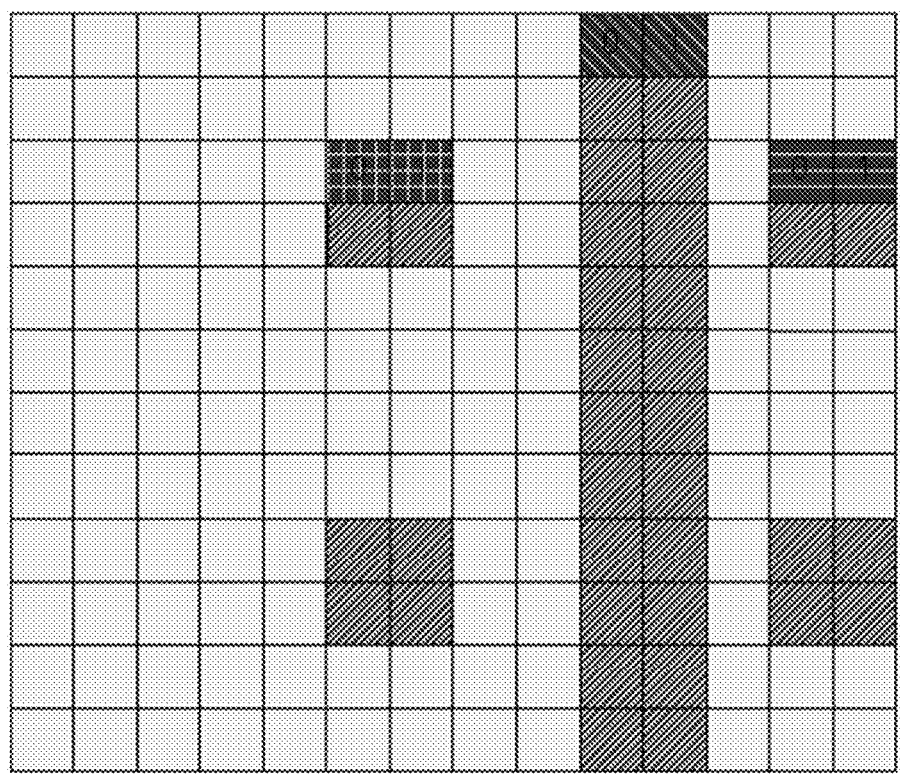
FIG. 1 illustrates example CSI-RS patterns for two antenna ports.
Figure 2:
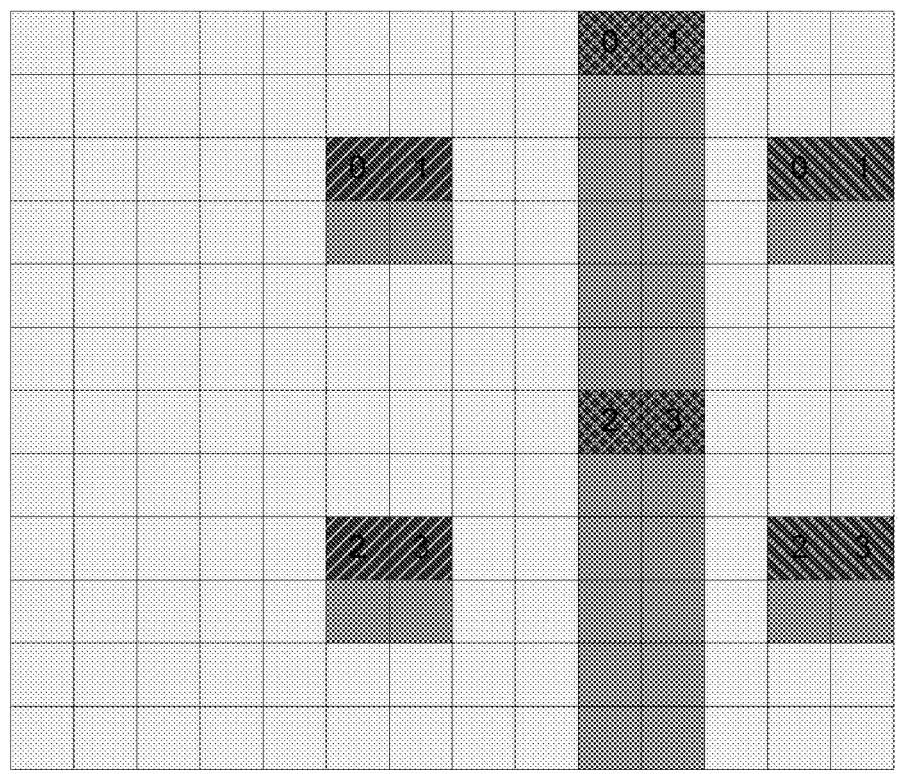
FIG. 2 illustrates example CSI-RS patterns for four antenna ports.
Figure 3:
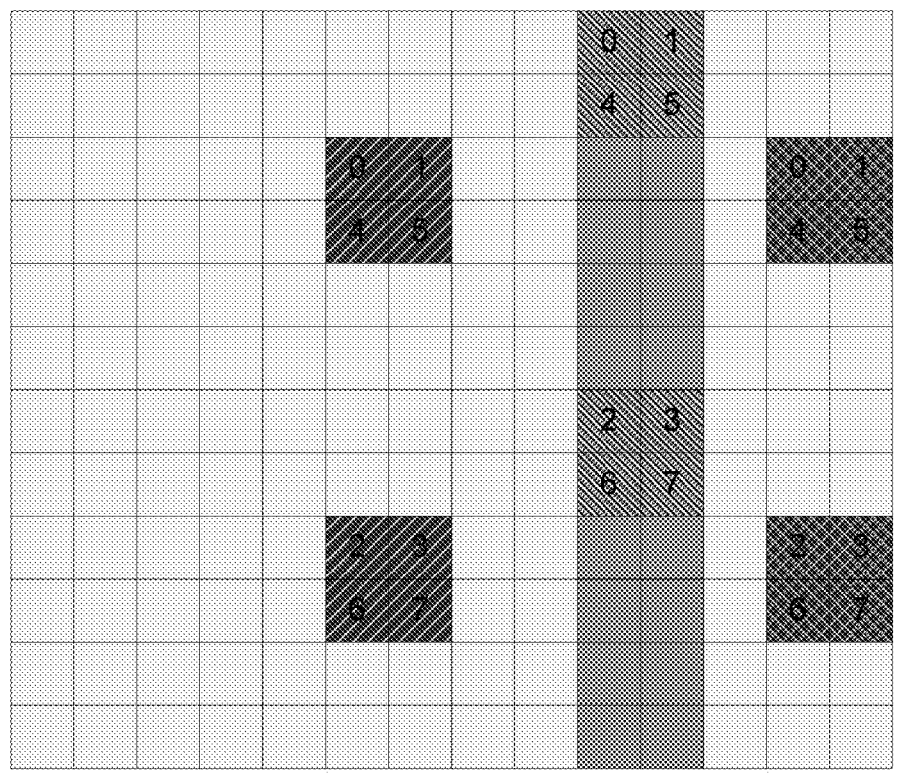
FIG. 3 illustrates example CSI-RS patterns for eight antenna ports.

FIG. 1 illustrates example CSI-RS patterns 100 using OFDM symbols with normal cyclic prefix (CP) for two antenna ports. There are 14 OFDM symbols labeled from 0 to 13. The CSI-RS patterns 100 are signaled from the wireless network to a UE. The symbols 0 to 6 correspond to even slots, and the symbols 7 to 13 correspond to odd slots. There are 12 subcarriers labeled from 0 to 11. The CSI-RS patterns 100 include three patterns that are obtain by shifts in frequency domain. Each pattern comprises a plurality of resource elements or blocks, where each resource block corresponds to one subcarrier and one symbol. The three patterns are indicated by different three corresponding shading patterns (two diagonal shading patterns and one diamond shading pattern). Other patterns with two antenna ports may also be obtained (for example in any of the blocks with gray shading). For each pattern, number "0" indicates a first antenna port of the UE (antenna port 0), and number "1" indicates a second antenna port of the UE (antenna port 1). FIG. 2 illustrates example CSI-RS patterns 200 using OFDM symbols with normal CP for four antenna ports. For each pattern, numbers "0", "1", "2", and "3" indicate four corresponding antenna ports. FIG. 3 illustrates example CSI-RS patterns 300 using OFDM symbols with normal CP for eight antenna ports. For each pattern, numbers "0" to "7" indicate eight corresponding antenna ports. Other CSI-RS patterns with extended CP can be defined similarly.

The resource element of each of the patterns above may be denoted by (k', l') per resource block, where the pair k' and l' indicates the subcarrier number and symbol number respectively in Physical resource block (PRB). All the CSI-RS patterns can be represented as shown in Table 1 below, where $n_s$ is the slot number. The CSI-RS patterns 100, 200, and 300 are signaled by the wireless network to a UE, e.g., by a base station (BS) or an E-UTRAN Node-B (eNB). The CSI-RS port number and CSI-RS configuration are also signaled to the UE via dedicated higher layer signaling in Release 10. The number of ports is signaled using 2 bits of data and the CSI-RS configuration is signaled using 5 bits of data.

The CSI-RS has a low density compared with the CRS. The subframe with CSI-RS transmission is defined by the duty cycle and subframe offset. For example, the duty cycle can be 5 milliseconds (ms), 10 ms, 20 ms, 40 ms, or 80 ms. The cycle and subframe offset for the CSI-RS are also signaled to the UE via dedicate higher layer signaling in Rel-10. A Rel-10 UE may assume PDSCH rate matching around the CSI-RS resource elements (REs), after UE capability (e.g., the UE's release) is known by the eNB or BS for all unicast PDSCH transmissions in any of the available transmission modes. For example, Table 1 shows that when a Rel-10 UE is configured in transmission mode 9, The UE uses the CSI-RS (for 1, 2, 4, or 8 antenna ports) for CQI/PMI feedback measurement.

TABLE 1

Mapping from CSI configuration to (k', l') for normal cyclic prefix.

| Frame structure type | CSI Configuration | Number of CSI reference signals configured | | | | | |
|---|---|---|---|---|---|---|---|
| | | 2 | | 4 | | 8 | |
| | | (k', l') | $n_s$ mod 2 | (k', l') | $n_s$ mod 2 | (k', l') | $n_s$ mod 2 |
| FS 1 & 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| FS 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

In accordance to the 3GPP Rel-10, which is incorporated herein, the configuration of multiple non-zero-power CSI-RS resources includes configuring the following parameters: antennaPortsCount, resourceConfig, subframeConfig, and $P_c$.

The CSI-RS may be interfered by the PDSCH of neighbor cells. Thus PDSCH RE muting can be used to reduce the interference to the CSI-RS of neighbor cell(s). This may be done by using a zero-power CSI-RS resource (e.g., muting resource) in Rel-10. There is signaling to inform Rel-10 UE the muting pattern. Hence, Rel-10 UE discards the muted resource elements in the reception of PDSCH. The zero-power CSI-RS resource is configured and signaled by a 16 bit bitmap. Each bit represents a 4-ports CSI-RS pattern. The bit 1 indicates the 4-port CSI-RS pattern is muted, and bit 0 indicates the 4-ports CSI-RS pattern is not muted. Although muting is to reduce the interference to CSI-RS of neighbor cells, there may be no direct relationship between muting pattern in current cell and CSI-RS patterns of neighbor cells. In other words, the muting pattern can be configured in a cell independently. As described in TS 36.331v10.4.0 for Rel-10, the non-zero-power and zero-power CSI-RS resources can be signaled according to Tables 2 and 3.

TABLE 2

CSI-RS-Config information elements.

```
-- ASN1START
CSI-RS-Config-r10 ::=    SEQUENCE {
    csi-RS-r10                      CHOICE {
        release                         NULL,
        setup                           SEQUENCE {
            antennaPortsCount-r10           ENUMERATED {an1, an2, an4, an8},
            resourceConfig-r10              INTEGER (0..31),
            subframeConfig-r10              INTEGER (0..154),
            p-C-r10                         INTEGER (-8..15)
        }
    }                               OPTIONAL,           -- Need ON
    zeroTxPowerCSI-RS-r10           CHOICE {
        release                         NULL,
        setup                           SEQUENCE {
            zeroTxPowerResourceConfigList-r10   BIT STRING (SIZE (16)),
            zeroTxPowerSubframeConfig-r10       INTEGER (0..154)
        }
    }                               OPTIONAL            -- Need ON
}
-- ASN1STOP
```

TABLE 3

CSI-RS-Config field descriptions.

antennaPortsCount
Parameter represents the number of antenna ports used for transmission of CSI reference signals where an1 corresponds to 1, an2 to 2 antenna ports etc. see TS 36.211 [21, 6.10.5].
p-C
Parameter: $P_c$, see TS 36.213 [23, 7.2.5].
resourceConfig
Parameter: CSI reference signal configuration, see TS 36.211 [21, table 6.10.5.2-1 and 6.10.5.2-2].
subframeConfig
Parameter: $I_{CSI-RS}$, see TS 36.211 [21, table 6.10.5.3-1].
zeroTxPowerResourceConfigList
Parameter: ZeroPowerCSI-RS, see TS 36.211 [21, 6.10.5.2].
zeroTxPowerSubframeConfig
Parameter: $I_{CSI-RS}$, see TS 36.211 [21, table 6.10.5.3-1].

System and method embodiments are provided for signaling or indicating reference signals and CSI feedback for wireless communications. The embodiments include various aspects and details of signaling methods and systems for signal/channel/interference measurements and CSI feedback based on UE-specific resources (e.g., CSI-RS resources). The systems and methods include further embodiments and details to those provided in U.S. patent application Ser. No. 13/732,129 filed on Dec. 31, 2012 by Weimin Xiao et al. and entitled "System and Method for Wireless Communications Measurements and CSI Feedback," which is hereby incorporated herein by reference as if reproduced in its entirety. The embodiments include indexing methods for CSI-RS resources and CRS resources, e.g., to indicate on which resources the UE is assumed to perform signal/channel/interference measurements. The CSI-RS/CRS resources can be indexed to differentiate between multiple resources. The embodiments also include signaling to indicate whether or not a signal is to be subtracted from a non-zero-power CSI-RS resource configured for interference measurements, and fallback methods.

The indexing methods and signaling are used for configuring CSI-RS based signal/channel measurements, for configuring CSI-RS based interference measurements, and for configuring CQI reports. This includes an indexing scheme to link each CQI report to the subset of CSI-RS resources for signal measurements and to the subset of CSI-RS resources for interference measurements. Indexing CQI reports by the network and signaling the indexes to the UE is one way to allow the UE to identify the relative priorities of these CQI reports and hence in case of collision, the UE knows which CQI report to send (and hence drop other reports) in consistent with network's understanding. The provided embodiments allow further flexibility of measurements/CSI feedback/transmissions and can support new types of transmission schemes, e.g., for cooperative multi-point (CoMP) and heterogeneous network (HetNet). For example, the Rel-10 almost blank subframe (ABS) based Enhanced Inter-Cell Interference Control (eICIC) can be realized by CoMP CSI feedback without resorting to traditional technique used for eICIC (e.g., the resource-restricted measurements).

With regard to signal/channel measurements, an E-UTRAN Node B (eNB) can allow a CSI report for a Rel-11 UE to be configured with zero, one, or more non-zero-power CSI-RS resources for signal/channel measurements by dedicated signaling. If no or zero non-zero-power CSI-RS resource is configured for signal/channel measurements for a CSI report by dedicated signaling to a Rel-11 UE, the UE is assumed to perform signal/channel measurements for the CSI report based on CRS.

In an embodiment, the total number of non-zero-power CSI-RS resources for a Rel-11 UE for signal/channel measurements is configured by dedicated signaling. In another embodiment, the maximum number of non-zero-power CSI-RS resources for a Rel-11 UE for signal/channel measurements is predefined in standards specifications, e.g., 2, 3, 4, or more. An eNB/Mobility Management Entity (MME)/CoMP set controller may choose to further limit the actual maximum number via dedicated signaling. For instance, the standards specification may predefine the maximum to be 4, but a CoMP set controller may signal to all the eNBs controlled by it an actual maximum to be 2 and the eNBs inform all UEs via dedicated signaling. In another embodiment, no limit to the maximum number of non-zero-power CSI-RS resources for a Rel-11 UE for signal/channel measurements is specified/signaled, but the actual maximum number of non-zero-power CSI-RS resources for a Rel-11

UE for signal/channel measurements may be practically limited by, for example, the total number of CSI-RS resources for a Rel-11 UE.

In an embodiment, the total number of ports in non-zero-power CSI-RS resources for a Rel-11 UE for signal/channel measurements is configured by dedicated signaling. In another embodiment, the maximum number of ports in non-zero-power CSI-RS resources for a Rel-11 UE for signal/channel measurements is predefined in standards specifications, e.g., 16, 32, or more. An eNB/MME/CoMP set controller may choose to further limit the actual maximum number via dedicated signaling. For instance, the standards specification may predefine the maximum to be 32, but a CoMP set controller may signal to all the eNBs controlled by it an actual maximum to be 8 and the eNBs inform all UEs via dedicated signaling. In another embodiment, no limit to the maximum number of ports in non-zero-power CSI-RS resources for a Rel-11 UE for signal/channel measurements is specified/signaled, but the actual maximum number of ports in non-zero-power CSI-RS resources for a Rel-11 UE for signal/channel measurements may be practically limited by, for example, the total number of ports in CSI-RS resources for a Rel-11 UE.

In an embodiment, a dedicated signaling to configure signal/channel measurements to a Rel-11 UE can be signaled together with CSI-RS configurations. For instance, in a CSI-RS configuration, a field is added to indicate for which CQI report(s) this CSI-RS resource(s) is to be used for signal/channel measurements. The CQI report(s) may be configured in a separate signaling(s) and may be indexed, and the indication can be based on index(es) of the CQI report(s). In this case, the dedicated signaling also indicates if a CSI-RS resource is also used for Radio Resource Management (RRM)/Radio Link Monitoring (RLM) measurements. However, when a CSI-RS resource is changed/added/removed, the CQI reports may also need to be reconfigured. When a CQI reports also needs to be reconfigured/added/removed, the CSI-RS configurations may need to be re-signaled since some CQI configuration information is signaled with a CSI-RS configuration.

In an embodiment, a dedicated signaling to configure signal/channel measurements to a Rel-11 UE can be signaled together with CQI report configurations. For instance, in a CQI report configuration, a field is added to indicate for which non-zero-power CSI-RS resource(s) to be used for signal/channel measurements for this CQI report. The non-zero-power CSI-RS resource(s) may be configured in a separate signaling(s) and may be indexed, and the indication can be based on index(es) of the resource(s) or the X value(s) of the resource(s). In this case, if only the CQI report is reconfigured/added/removed, there may not be a need to re-signal the CSI-RS configurations. In an embodiment, a dedicated signaling to configure signal/channel measurements to a Rel-11 UE can be signaled separately from CQI/CSI-RS configuration signaling, which may be a bitmap linking the CQI reports to the associated CSI-RS resources for signal/channel measurements, or a bitmap linking the CSI-RS resources for signal/channel measurements to the associated CQI reports. The indication can be based on index(es) of the resource(s) or the X value(s) of the resource(s), and the index(es) of the CQI report(s). In this case, if only the CQI report is reconfigured/added/removed, there may not be a need to re-signal the CSI-RS configurations.

A Rel-11 UE may be assumed to perform channel/signal/RRM/RLM measurements for a CSI report only on the RS (including CRS, CSI-RS) resource(s) indicated by dedicated signaling for the CSI report if the signaling is found, and otherwise on CRS only. Furthermore, if a resource-restricted measurement subset is signaled for restricting signal/channel measurement resources (note that however, in 3GPP generally resource-restricted measurements are only for restricting the interference measurement resources, not restricting the signal/channel measurement resources), then the UE is assumed to further restrict its signal/channel measurements within the indicated subset. In an embodiment, an eNB may configure three non-zero-power CSI-RS resources for a UE, and a non-zero-power CSI-RS resource may be assigned with no CQI report for signal measurements (also no interference measurements). In such a case, the UE is not assumed to perform channel/signal/RRM/RLM measurements (nor interference measurements) on this resource until otherwise signaled by an eNB. For example, when the UE receives and demodulates/decode PDSCH, the UE is assumed to perform rate matching and/or discarding the REs indicated as non-zero-power CSI-RS resources but not linked to any CQI. On those REs, the eNB can decide to transmit signals not limited to the signaled CSI-RS contents, but may choose to blank (so that a CSI-RS resource from another point/cell may transmit without interference from this point/cell), or may choose to transmit special signals (e.g., so that a CSI-RS resource from another point/cell may see the desired interference from this point/cell and a UE can perform the desired interference measurements).

For example, in HetNet eICIC, a pico UE may need to report a CQI with a macro muting and a CQI with a macro interfering, based on measurements on CSI-RS resources. When the UE measures interference on a CSI-RS resources associated with macro muting, the macro does not need to be in an ABS. However, the macro needs to blank on the corresponding REs and can choose to mark these REs as a non-zero-power CSI-RS resource that is not linked to any CQI report so that macro UEs may rate match around these REs. Similarly, when the UE measures interference on a CSI-RS resource associated with macro interfering, the macro does not need to be in a non-ABS. However, the macro may transmit any chosen signals on the corresponding REs and can choose to mark these REs as a non-zero-power CSI-RS resource that is not linked to any CQI report so that macro UEs may rate match around these REs.

Similarly, in Further Enhanced Inter-Cell Interference Control (FeICIC), when the pico UE measures interference on a CSI-RS resource associated with macro interfering with reduced power, the macro does not need to be in an ABS, but may transmit at the reduced power on the corresponding REs. The macro can choose to mark these REs as a non-zero-power CSI-RS resource that is not linked to any CQI report so that macro UEs may rate match around these REs. Similarly, in Coordinated Beam Blanking (CBB) or other semi-statically configured interference coordination schemes, when the UE measures interference on a CSI-RS resource associated with macro interfering with a spatial/beamforming/beam-blanking pattern, the macro does not need to transmit PDSCH according to the pattern. However, the macro may transmit according to the pattern on the corresponding REs and can choose to mark these REs as a non-zero-power CSI-RS resource that is not linked to any CQI report so that macro UEs may rate match around these REs. In other words, configuring a non-zero-power CSI-RS resource that is not linked to any CQI report is a way to allow an eNB to "emulate" or "mock" the desired interference on those REs without affecting its UE's operations. This is also a way to allow an eNB to do an operation on those REs which may be backward incompatible. In other words, signaling a non-zero-power CSI-RS resource to a UE which is not used for a CQI report is a way for the network to transparently perform RE muting or interference emulation or non-compatible transmissions without affecting the UE behavior. As described below, another way of doing so is to signal a zero-power CSI-RS resource to a UE which is not used for a CQI report. A pro for using a non-zero-power CSI-RS resource for this purpose is that the non-zero-power CSI-RS resource can be configured much more flexibly (e.g. in terms of periodicity, subframe offset, number of antenna ports) than the zero-power CSI-RS resource, but a con is higher signaling overhead may be involved.

Further, a Rel-11 UE may assume that a signaled CSI-RS resource for channel/signal measurements for a CSI report corresponds to one channel/signal condition (within each resource-restricted measurement subset, if signaled). A CSI-RS resource signaled to a Rel-11 UE for channel/signal measurements can be associated with a unique CSI-RS index explicitly or implicitly. For instance, CRS resource is implicitly indexed as 0. In some embodiments, an eNB (or the network) allows a non-zero-power CSI-RS resource to be configured with zero (no), one, or more $P_c$ values. $P_c$ is the assumed ratio of PDSCH EPRE to CSI-RS EPRE when UE derives CSI feedback and takes values in the range of [−8, 15] dB with 1 dB step size, where the PDSCH EPRE corresponds to the symbols for which the ratio of the PDSCH EPRE to the cell-specific RS EPRE is denoted by $\rho_A$, as specified in Table 5.2-2 and Table 5.2-3 of TS 36.213. In other words, the $P_c$ value is used by the UE to compute the associated CQI report, and different $P_c$ values can lead to different CQI feedback values even if the CQI feedback values are based on common channel/signal/interference measurement resources. When there is a possibility of multiple CQI reports but a same non-zero-power CSI-RS resource is configured for these CQI reports' signal/channel measurements, allowing more than one $P_c$ values to be configured for the same non-zero-power CSI-RS resource can enable the UE to compute each CQI report with the CQI-report-specific $P_c$ value. Another advantage of allowed one or more $P_c$ values to be associated with a non-zero-power CSI-RS resource is that this resource may be used for generating two different CQI reports for resource-restricted measurements, namely, each CQI report may be associated with a $P_c$ value. If no $P_c$ value is configured for a non-zero-power CSI-RS resource, the UE is assumed to perform rate matching around the CSI-RS REs. Other ways to signal a UE to perform rate matching around the CSI-RS REs may be used, such as a bit to indicate so, or by linking no CQI report to this CSI-RS resource.

With regard to interference measurements, in 3GPP it was proposed to use either non-zero-power CSI-RS resources or zero-power CSI-RS resources or both for interference measurement resources. If a zero-power CSI-RS resource is to be used for interference measurement, it was generally proposed that each interference measurement resource is a 4-RE resource within a zero-power CSI-RS resource and is associated with one bit of the 16-bit bitmap of the zero-power CSI-RS resource. Such a 4-RE measurement resource unit may be called as a interference measurement resource (IMR), or channel-state information interference measurement (CSI-IM) resource, or a zero-power CSI-RS resource for interference measurement. In an embodiment, an eNB can allow zero, one, or multiple non-zero-power CSI-RS resources, and/or zero, one, or multiple zero-power CSI-RS resources to be configured to a Rel-11 UE for interference measurements for CSI feedback by dedicated signaling. In an embodiment, the total number of non-zero-power CSI-RS resources and/or zero-power CSI-RS resources for a Rel-11 UE for interference measurements is configured by dedicated signaling. In an embodiment, the total number of zero-power CSI-RS resources for a Rel-11 UE for interference measurements is configured by dedicated signaling. In an embodiment, the total number of zero-power CSI-RS resources for a Rel-11 UE (not limited for the purpose of interference measurements) is configured by dedicated signaling. The maximum of any such total number may be predefined in standards specifications or specified as follows.

In another embodiment, the maximum number of non-zero-power CSI-RS resources and/or zero-power CSI-RS resources for a Rel-11 UE for interference measurements is predefined in standards specifications, e.g., 2, 3, 4, or more. An eNB/MME/CoMP set controller may choose to further limit the actual maximum number via dedicated signaling. For instance, the standards specification may predefine the maximum to be 4, but a CoMP set controller may signal to all the eNBs controlled by it an actual maximum to be 2. The eNBs inform all UEs via dedicated signaling. In another embodiment, no limit to the maximum number of non-zero-power CSI-RS resources and/or zero-power CSI-RS resources for a Rel-11 UE for interference measurements is specified/signaled. However, the actual maximum number of non-zero-power CSI-RS resources and zero-power CSI-RS resources for a Rel-11 UE for interference measurements may be practically limited by, e.g., the total number of CSI-RS resources for a Rel-11 UE.

In an embodiment, the total number of non-zero-power CSI-RS resources and/or zero-power CSI-RS resources for a Rel-11 UE is configured by dedicated signaling. In another embodiment, the maximum number of non-zero-power CSI-RS resources and/or zero-power CSI-RS resources for a Rel-11 $_U$E is predefined in standards specifications, e.g., 2, 3, 4, or more. The eNB/MME/CoMP set controller may choose to further limit the actual maximum number via dedicated signaling. For instance, the standards specification may predefine the maximum to be 4, but a CoMP set controller may signal to all the eNBs controlled by it an actual maximum to be 2. The eNBs inform all UEs via dedicated signaling. In another embodiment, no limit to the maximum number of non-zero-power CSI-RS resources and/or zero-power CSI-RS resources for a Rel-11 UE is specified/signaled.

As described above, in some embodiments, it may be allowed that the configuration of the number of zero-power CSI-RS resources for interference measurements is not related to the configuration of the number of zero-power CSI-RS resources (which may be used for interference measurements and/or RE muting and/or other purposes). This may be useful since it provides more flexibility to configure zero-power CSI-RS resources for interference measurements and zero-power CSI-RS resources for purposes not limited to interference measurements; however this may imply that separate signaling of zero-power CSI-RS resources for interference measurements and zero-power CSI-RS resources.

In some embodiments, an eNB can allow a CSI report for a Rel-11 UE to be configured with zero, one, or more non-zero-power CSI-RS resources and/or zero, one, or more zero-power CSI-RS resources for interference measurements by dedicated signaling. If no or zero CSI-RS resource is configured for interference measurements for a CSI report by dedicated signaling to a Rel-11 UE, the UE is assumed to perform interference measurements for the CSI report based on CRS.

In an embodiment, a dedicated signaling to configure interference measurements to a Rel-11 UE can be signaled together with CSI-RS configurations. For instance, in a CSI-RS configuration, a field is added to indicate for which CQI report(s) this CSI-RS resource(s) is to be used for interference measurements. The CQI report(s) may be configured in a separate signaling and may be indexed, and the indication can be based on index(es) of the CQI report(s). However, when a CSI-RS resource is changed/added/removed, the CQI reports may also need to be reconfigured. When a CQI reports also needs to be reconfigured/added/removed, the CSI-RS configurations may need to be re-signaled since some CQI configuration information is signaled with a CSI-RS configuration.

In an embodiment, a dedicated signaling to configure interference measurements to a Rel-11 UE can be signaled together with CQI report configurations. For instance, in a CQI report configuration, a field is added to indicate which (zero-power or non-zero-power) CSI-RS resource(s) to be used for interference measurements for this CQI report. The CSI-RS resource(s) to be used for interference measurements may be configured in a separated signaling and may be indexed, and the indication can be based on index(es) of the resource(s). In this case, if only the CQI report is reconfigured/added/removed, there may not always be to need to re-signal the CSI-RS configurations. In an embodiment, a dedicated signaling to configure interference measurements to a Rel-11 UE can be signaled separately from CQI/CSI-RS configuration signaling, which may be a bitmap linking the CQI reports to the associated CSI-RS resources for interference measurements, or a bitmap linking the CSI-RS resources for interference measurements to the associated CQI reports. The indication can be based on index(es) of the resource(s), and the index(es) of the CQI report(s). In this case, if only the CQI report is reconfigured/added/removed, there may not always be a need to re-signal the CSI-RS configurations.

Further, Rel-11 UE may be assumed to perform interference measurements for a CSI report only on the RS (including CRS, CSI-RS) resource(s) indicated by dedicated signaling for the CSI report if the signaling is found, and otherwise on CRS only. Furthermore, if a resource-restricted measurement subset is signaled, then the UE is assumed to further restrict its interference measurements within the indicated subset. In an embodiment, an eNB may configure three CSI-RS resources for a UE, and a CSI-RS resource may be assigned with no CQI report for signal measurements and no interference measurements. In such a case, the UE is not assumed to perform any measurements on this resource until otherwise signaled by an eNB.

For example, for PDSCH reception the UE is assumed to perform rate matching and/or discarding the REs indicated as resources for interference measurements but associated with no CQI report. On those REs, the eNB can decide to transmit signals not limited to the signaled CSI-RS contents, but may choose to blank (so that a CSI-RS resource from another point/cell may transmit without interference from this point/cell), or to transmit special signals (e.g., so that a CSI-RS resource from another point/cell may see the desired interference from this point/cell and a UE can perform the desired interference measurements). If a non-zero-power CSI-RS resource is signaled to a Rel-11 UE for interference measurements, the UE is also informed by dedicated signaling that if it is assumed to remove the signal of that CSI-RS or not to when performing interference measurements. This may be indicated using a bit in the dedicated signaling. Further, a CSI-RS resource signaled to a Rel-11 UE for interference measurements can be associated with a unique CSI-RS index explicitly or implicitly. For instance, CRS resource is implicitly indexed as 0.

With regard to CSI configuration and calculation, an eNB (or the network) allows one or multiple CQI reports to be configured for a Rel-11 UE by dedicated signaling. In an embodiment, the total number of CQI reports for a Rel-11 UE is configured by dedicated signaling. In another embodiment, the maximum number of CQI reports for a Rel-11 UE is predefined in the standards specifications, for instance, at most 2, or 3, or 4, or more CQI reports for a Rel-11 UE. In another embodiment, Rel-11 does not explicitly specify a limit to the maximum number of CQI reports for a Rel-11 UE. In some embodiments, an eNB can allow a CQI report for a Rel-11 UE to be configured, such as via dedicated signaling, to be periodic with a reporting period, subframe offset, and Physical Uplink Control Channel (PUCCH) mode, and/or to be aperiodic with a PUSCH mode.

When multiple CQI reports are to be fed back based on multiple CSI-RS resources and possibly CRS resources, it may be required to link a CQI report to the reference signals properly, for instance via dedicated signaling. To this aim, for a Rel-11 UE, an eNB can allow a CQI report to be configured based on signal/channel measurements of CRS resources as in Rel-10 or signal/channel measurements of zero, one, or multiple non-zero-power CSI-RS resources, and based on interference measurements of CRS resources as in Rel-10 or interference measurements of zero, one, or multiple non-zero-power and/or zero-power CSI-RS resources. If the signaling to link CQI with RS for a Rel-11 UE is not found for a CQI report, the UE is assumed to compute the CQI report based on CRS.

To ensure no ambiguity during the linking process, explicit and/or implicit indexing (or ordering) is adopted. When such indexing or ordering is implemented, an eNB dedicated signaling can then notify a UE of the linking between a CQI report and reference signal(s), e.g., via a bitmap. A CQI report is associated with a unique CQI report index explicitly or implicitly. A CSI-RS resource is also associated with a unique CSI-RS index explicitly or implicitly. A CRS resource can be implicitly indexed as 0. Note that the indexing for CQI reports may be useful if the linking between a CQI report and its measurement resources is configured in a signaling separate from the CQI configuration signaling and the measurement resource configuration signaling.

Embodiments of indexing methods for CSI-RS resources include indexing CSI-RS resources separately for signal and for interference. In this method, all CSI-RS resources for signal measurements are included in a list and indexed. All CSI-RS resources for interference measurements are included in another list and indexed. The maximum bit-widths for the indexes may be, e.g., 2 bits for signal resources, and 2 or 3 bits for interference resources. However, in case a non-zero-power CSI-RS resource may be used for both signal and interference, it needs to be indexed in two places, which is may not sufficiently efficient. But if only zero-power CSI-RS resources can be used for interference measurements, then this efficiency issue may not occur. In another method of indexing CSI-RS resources separately for zero-power and for non-zero-power, all non-zero-power CSI-RS resources are included in a list and indexed, and include all zero-power CSI-RS resources are included in another list and indexed. The maximum bit-widths for the indexes may be, e.g., 2 bits for zero-power resources, and 2 or 3 bits for non-zero-power resources. In yet another method of indexing all CSI-RS resources together, all CSI-RS resources are included in a list and indexed regardless of whether the CSI-RS is to be used in measurements or not (that is, a CSI-RS resource may not be linked to any measurements for CSI or RRM/RLM), regardless of whether the CSI-RS is to be used in interference and/or signal measurements or not, and regardless of whether the CSI-RS is zero-power or non-zero-power. This may help save a few bits than other alternatives, and the maximum bit-widths may be, e.g., 2 or 3. Combinations of the above embodiments may also be used or allowed.

In the above methods, the indexes may be contiguous, such as 0, 1, 2, . . . , etc. Therefore, there may be no need to explicitly define the indexes and an eNB and UE may just follow the ordering within the signaling. This contiguous way may help save some bits in the signaling. However, if any CSI-RS resource is added/removed/replaced and needs to be re-indexed, an eNB may need to re-signal the entire list of CSI-RS resources to a UE.

Alternatively, the indexes may be non-contiguous, such as 1, 9, 5, . . . , a so on. In this case, there is a need to explicitly define the indexes, or reuse the X factors in determining $c_{init}$ as the indexes (however this is applicable to non-zero-power CSI-RS resources only). This non-contiguous way may require more bits in signaling the configurations, but if any CSI-RS resource is added/removed/replaced and needs to be re-indexed, there would be no need to re-signal the entire list of CSI-RS resources. Moreover, there may be no need for extra bits to indicate if a resource is added/removed/replaced (the UE can know whether a new resource is configured and/or indexed). For example, if index 9 was signaled for a CSI-RS configuration, and index 9 is signaled again later, a UE can know that the CSI-RS resource is replaced. If index 9 was not in use and index 9 is signaled, a UE can know that the CSI-RS resource is added. If index 9 was in use and index 9 is signaled with no CSI-RS configuration, a UE can know that the CSI-RS resource is deleted. For CRS resource, it may be implicitly indexed as 0. It may also be explicitly indexed according to cell ID, for example, or other suitable identifier. Alternatively, CRS may not need to be indexed or used according to the transmission modes, e.g., CoMP versus non-CoMP.

Embodiments of indexing methods for CQI reports include indexing CQI reports separately for periodic or aperiodic cases. An eNB may include all periodic CQI reports in a list and index them, and include all aperiodic CQI reports in a list and index them. The maximum bit-widths may be, e.g., 2 or 3 bits for periodic reports, and 2 or 3 bits for aperiodic reports. To trigger a set of aperiodic CQI reports, PDCCH CSI request field can be used. In Rel-10, the field bit width is 2 and can support up to 3 aperiodic CQI report sets (the 2 bits are used for no CSI report triggered, aperiodic report set #1, aperiodic report set #2, aperiodic report set #3) originally designed for carrier aggregation purpose. In other words, in Rel-10 carrier aggregation, there may be multiple aperiodic CQI reports, each of which is for one serving cell; then upper layer signaling assigns each such aperiodic CQI report with an index taking at most three values, and the associated aperiodic CQI report(s) are then triggered if the PDCCH CSI request field indicates an aperiodic CQI report set. This may be extended for CoMP. In Rel-11 CoMP, there may be multiple aperiodic CQI reports, each of which is for one CoMP transmission mode (e.g. single-cell transmission, DPS/DPB, CS/CB, JT, etc.); then upper layer signaling assigns each such aperiodic CQI report with an index taking at most three values, and the associated aperiodic CQI report(s) are then triggered if the PDCCH CSI request field indicates a aperiodic CQI report set. If more than 3 aperiodic CQI report indexes are needed to be configured, the 2 bit CSI request field in Rel-10 PDCCH needs to be expanded to 3 bits. Similar to CSI-RS resource indexing, the indexes for CQI reports may be contiguous or non-contiguous, and the indexes may be implicit or explicit.

Additionally, the indexing and linking between CSI-RS resources and CQI reports may be standardized in standards specifications. For example, if a CoMP measurement set contains two points (or two cells), then the CQI reports and CSI-RS resources may be indexed and linked using the configurations of Table 1 above as follows:

(A) Point 1 transmits a CSI-RS: non-zero-power, using configuration 3 (see Table 1). The purpose is to allow all UEs connected to Point 1 to measure signal/channel from Point 1.
(B) Point 2 transmits a CSI-RS: non-zero-power, using configuration 4. The purpose is to allow all UEs connected to Point 1 to measure signal/channel from Point 2.
(C) Point 1 transmits a CSI-RS: zero-power (or non-zero-power), using configuration 4. A purpose is to allow all UEs connected to Point 2 to measure signal/channel from Point 2 without the interference from Point 1.
(D) Point 2 transmits a CSI-RS: zero-power (or non-zero-power), using configuration 3. A purpose is to allow all UEs connected to Point 1 to measure signal/channel from Point 1 without the interference from Point 2.
(E) Point 1 transmits a CSI-RS: zero-power (or non-zero-power), using configuration 5. A purpose is to allow all UEs connected to Point 1 to measure interference including Point 2's interference.
(F) Point 2 transmits a CSI-RS: zero-power (or non-zero-power), using configuration 6. A purpose is to allow all UEs connected to Point 2 to measure interference including Point 1's interference.

If a UE has its CoMP set consisting of Points 1 and 2, then the eNB controlling the points may signal all the CSI-RS to the UE, and they are indexed as #1 to #6 respectively, in an implicit or explicit way. The standards specification or the dedicated signaling can indicate the following linking in Table 4.

TABLE 4

An example of linking CQI with measurement resources with CoMP set containing 2 points/cells.

| | Signal measurement resource(s) | Interference resource(s) |
|---|---|---|
| CQI report 1 | #1 | #5 (and remove signal if #5 is non-zero-power) |
| CQI report 2 | #2 | #6 (and remove signal if #6 is non-zero-power) |
| CQI report 3 | #1 | #1 (and remove signal) |
| CQI report 4 | #2 | #2 (and remove signal) |
| CQI report 5 | #1, #2 | #1 (and remove signal) |

Although CSI-RS resources #3 and #4 above are configured and signaled to the UE, they are not indicated to be used in any CQI report. The UE performs rate matching around these REs. Therefore, the eNB may configure them as either zero-power or non-zero-power. If they overlap with CSI-RS resources #1 and #2, respectively, they may not need to be signaled to the UE. The example of Table 4, any variations thereof, or part of the table, may be specified in the standards specifications to reduce signaling overhead. Though all the possible CQI reports are listed in the table, the eNB may select only a subset for a UE to report. When the CoMP set contains more than two points/cells, the resulting tables may be substantially large but the tables (or part of the tables) may still be captured in the standards specifications, leaving a remaining degree of freedom for dedicated signaling.

Table 4 above links CQI reports with CSI-RS resources. An alternative scheme can be used, which links CQI reports to points/cells, leaving a remaining degree of freedom for dedicated signaling. Table 5 shows an example of such scheme.

TABLE 5

An example of linking between CQI reports to 3 points/cells.

|  | Point1/cell1 | Point2/cell2 | Point3/cell3 |
| --- | --- | --- | --- |
| CQI report 1 | Signal | Interfere | Interfere |
| CQI report 2 | Signal | Mute | Interfere |
| CQI report 3 | Signal | Signal | Interfere |
| CQI report 4 | Interfere | Signal | Interfere |
| CQI report 5 | Mute | Signal | Interfere |
| CQI report 6 | Signal | Interfere | Mute |
| CQI report 7 | Signal | Mute | Mute |
| CQI report 8 | Signal | Signal | Mute |
| CQI report 9 | Signal | Interfere | Signal |
| CQI report 10 | Signal | Mute | Signal |
| CQI report 11 | Signal | Signal | Signal |
| CQI report 12 | Interfere | Signal | Mute |
| CQI report 13 | Interfere | Signal | Signal |
| CQI report 14 | Interfere | Interfere | Signal |
| CQI report 15 | Interfere | Mute | Signal |
| CQI report 16 | Mute | Signal | Mute |
| CQI report 17 | Mute | Signal | Signal |
| CQI report 18 | Mute | Interfere | Signal |
| CQI report 19 | Mute | Mute | Signal |

The upper left part of Table 5 (the italicized portion) can be used if there are two points/cells. Additional dedicated signaling can specify the CSI-RS resources for each point/cell, and which CQI reports are to be fed back. Such a table may also be generated using a particular rule/pattern so that the eNB/UE do not need to store the table information in memory but can retrieve each entry using the particular rule/pattern. The rule/pattern can be a simple base-3 number representation. For example, assign 0 to interfere, 1 to muting, and 2 to signal. Thus, all the CQI reports for 4 cells/points may be represented as 2222, 2122, 2022, 1222, 0222, etc.

In an embodiment, if a Rel-11 UE is configured to perform signal/channel/interference measurement based on CSI-RS resource(s) by dedicated signalling, the CSI reference resource in frequency domain is defined by the group of CSI reference signal REs corresponding to the band to which the derived CQI value relates, and in time domain is restricted in the downlink subframes which contain the CSI-RS resource(s) for the CQI (and in the indicated resource-restricted measurement subset, if signaled). Otherwise, a Rel-10 mechanism can be used. Alternatively, the reference resource in time domain may be based on the downlink subframes which contain the CSI-RS resource(s) for the CQI (and in the indicated resource-restricted measurement subset, if signaled) but interpolation/extrapolation is allowed so that the CQI can reflect the most recent (subject to four subframe processing delay) channel quality.

If a UE is configured with more than one serving cell or more than one CQI report configuration, the UE transmits a CSI report of only one serving cell or one CQI report configuration in any given subframe. In Rel-10 specification TS 36.213, collision handling of CSI reports for the carrier aggregation cases is specified, in which for each carrier there is only one periodic CQI report over PUCCH. In Rel-11 CoMP, this should be extended since each carrier may have multiple periodic CQI report over PUCCH. For a given subframe, in case of collision of a CSI report with Physical Uplink Control Channel (PUCCH) reporting type 3, 5, 6, or 2a of one serving cell (or one CQI report configuration) with a CSI report with PUCCH reporting type 1, 1a, 2, 2b, 2c, or 4 of another serving cell (or another CQI report configuration), the latter CSI with PUCCH reporting type (1, 1a, 2, 2b, 2c, or 4) has lower priority and is dropped. For a given subframe, in case of collision of CSI report with PUCCH reporting type 2, 2b, 2c, or 4 of one serving cell (or one CQI report configuration) with CSI report with PUCCH reporting type 1 or 1a of another serving cell (or another CQI report configuration), the latter CSI report with PUCCH reporting type 1 or 1a has lower priority and is dropped. In other words the UE will drop all CSI reports corresponding to lower priority and the priority is reflected only by the report type and not reflected by serving cell indexes or CQI indexed.

For a given subframe, in case of collision between CSI reports of different serving cells (or different CQI report configurations) with PUCCH reporting type of the same priority, the CSI of the serving cell with lowest ServCellIndex or of the CQI report configuration with lowest CQI index is reported, and CSI of all other serving cells or all other CQI report configuration are dropped. Some special cases are described in the following. For a given subframe, in case of collision between CSI reports of the same serving cell with PUCCH reporting type of the same priority, and the CSI reports corresponding to different CQI report configurations, the CSI of the serving cell and with lowest CQI index is reported, and CSI of all other CQI report configurations are dropped. For a given subframe, in case of collision between CSI reports of different serving cells with PUCCH reporting type of the same priority, and the CSI reports corresponding to the same CQI index, the CSI of the serving cell with lowest ServCellIndex is reported, and CSI of all other serving cells are dropped. For a given subframe, in case of collision between CSI reports of different serving cells with PUCCH reporting type of the same priority, and the CSI reports corresponding to different CQI indexes, the CSI of a CQI report configuration with lowest CQI index and of the serving cell with lowest CQI index is reported, and CSI of all other serving cells or other CQI indexes are dropped. Note that several embodiment methods can be proposed in the last case, wherein either the CSI according to the description in the last case is reported, or CSI of the lowest CQI index in the serving cell with lowest ServCellIndex index is reported; the former is preferred since it involves only one parameter (i.e. CQI index) to decide the collision handling, whereas the latter involves two parameters (i.e. both ServCellIndex and CQI index) to decide the collision handling due to the fact that each serving cell can have multiple CQI indexes assigned to it.

In an embodiment, Rel-10 Resource-restricted measurements are still used in Rel-11 separately or together with measurements for CoMP CSI feedback. When used with CoMP, the measurements and CSI feedback described above are still applicable subject to appropriate subset restrictions. In other embodiments, Rel-10 Resource-restricted measurements are not supported in Rel-11, Rel-10 Resource-restricted measurements are supported in Rel-11 in the form of CSI-RS based CSI feedback, Rel-10 Resource-restricted measurements are extended in Rel-11 in the form of CSI-RS based CSI feedback, Rel-10 Resource-restricted measurements are combined with CSI-RS based CSI feedback in Rel-11, or Rel-10 Resource-restricted measurements are supported in Rel-11 in as a subset of CSI-RS based CSI feedback.

Figure 4:
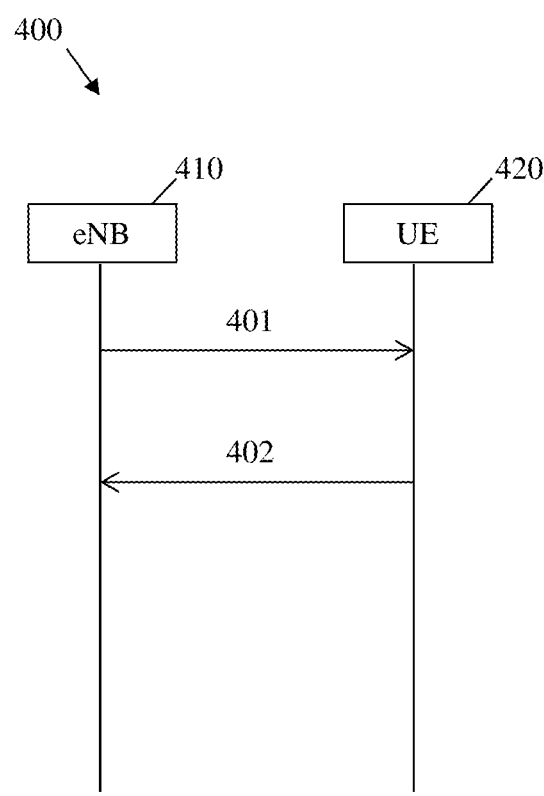
FIG. 4 illustrates an embodiment scheme for indicating reference signals and CSI feedback.

FIG. 4 illustrates an embodiment scheme 400 for indicating reference signals and CSI feedback. At step 401, an eNB 410 (or other network component) transmits or signals one or more indices to a UE 420. The one or more indices that indicate one or more corresponding CSI-RS resources and/or CQI reports. The one or more indices may include a first index that indicates a corresponding non-zero-power CSI-RS resource, a second index that indicates a corresponding zero-power CSI-RS resource, a third index that indicates a corresponding CSI-RS resource for interference measurement, and/or a fourth index that indicates a CQI report configuration. The indices may also include a fifth index that indicates a corresponding periodic CQI report in accordance with the CQI report configuration indicated by the fourth index. The indices may further include a sixth index that indicates a corresponding aperiodic CQI report in accordance with the CQI report configuration indicated by the fourth index.

At step 402, the UE 420 returns a response back to the eNB 410. The response includes a CSI report of a CQI report configuration for a subframe with a lowest value for the fourth index, in case of collision between CSI reports of the same serving cell with PUCCH reporting type of the same priority, and the CSI reports corresponding to different CQI report configurations with different values of the fourth index. The UE 420 also drops CSI for all other CQI report configurations. Additionally or alternatively, the response may include a CSI report of a serving cell for a subframe with a lowest value of ServCellIndex, in case of collision between CSI reports of different serving cells with PUCCH reporting type of the same priority, and the CSI reports corresponding to CQI report configurations with the same value of the fourth index. The UE 420 also drops CSI for all other serving cells. The response can also include upon receiving a triggering signaling indicating the sixth index, a CSI associated with the sixth index indicating the corresponding aperiodic CQI report for a subframe in accordance with the CQI report configuration indicated by the fourth index. The one or more signals or responses in the steps 401/402 can be sent jointly, e.g., in a single list or message, or separately.

Figure 5:
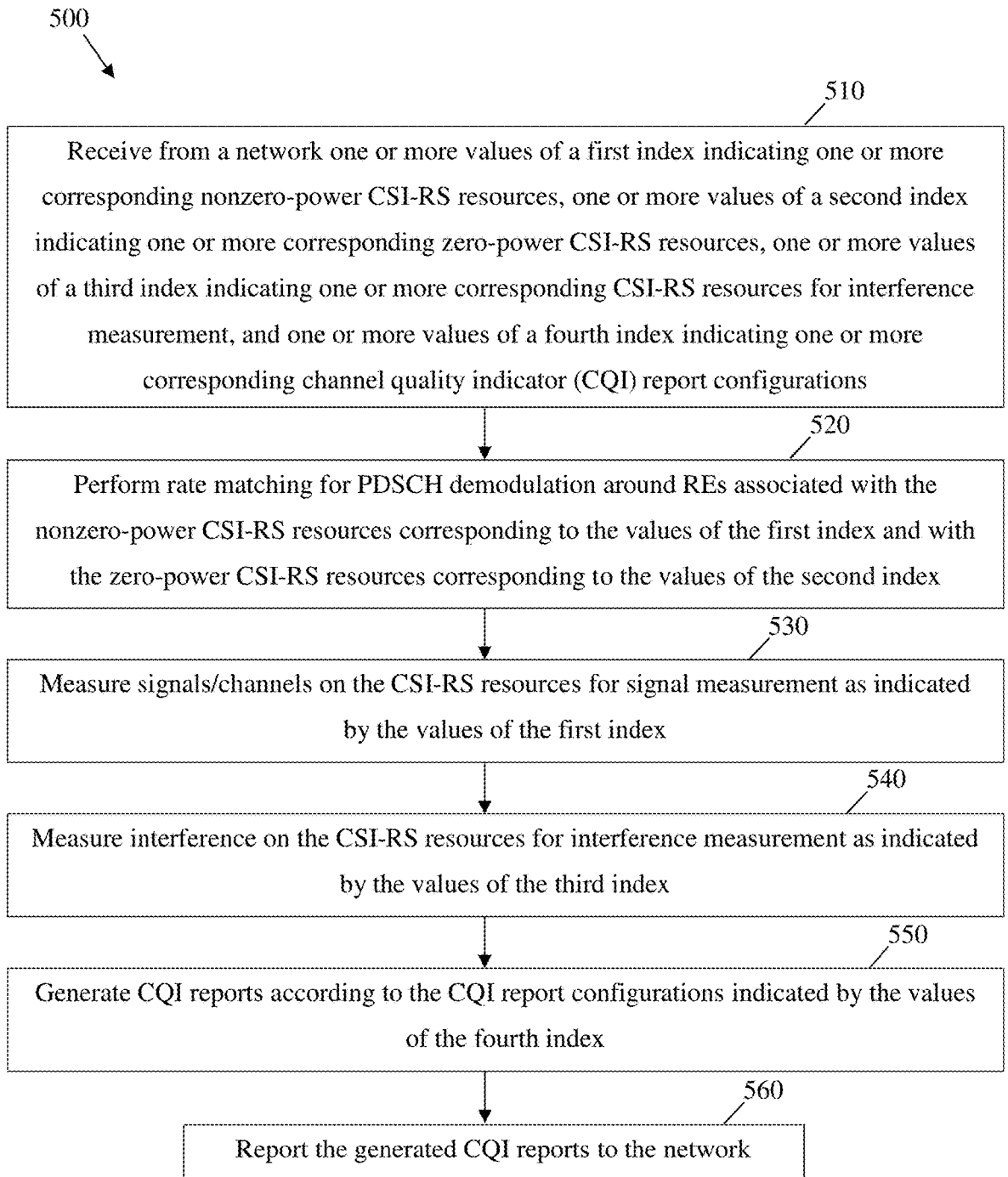
FIG. 5 illustrates an embodiment method by a UE for CSI feedback according to indicated reference signals.

FIG. 5 illustrates an embodiment method 500 for CSI feedback according to indicated reference signals. The method 500 is implemented by a UE that communicates with a network, such as via an eNB. At step 510, the UE receives from the network one or more values of a first index indicating one or more corresponding non-zero-power CSI-RS resources, one or more values of a second index indicating one or more corresponding zero-power CSI-RS resources, one or more values of a third index indicating one or more corresponding CSI-RS resources for interference measurement, and one or more values of a fourth index indicating one or more corresponding channel quality indicator (CQI) report configurations. At step 520, the UE performs rate matching for PDSCH demodulation around REs associated with the non-zero-power CSI-RS resources corresponding to the values of the first index and with the zero-power CSI-RS resources corresponding to the values of the second index. At step 530, the UE measures signals/channels on the CSI-RS resources for signal measurement as indicated by the values of the first index. At step 540, the UE measures interference on the CSI-RS resources for interference measurement as indicated by the values of the third index. At step 550, the UE generates CQI reports according to the CQI report configurations indicated by the values of the fourth index. At step 560, the generated CQI reports are reported by the UE to the network. In other embodiments, at least some of the steps in the method 500 can be implemented in a different order. Further, other embodiment methods for CSI feedback according to indicated reference signals may include only some of the steps above. For example, steps 520 and 530 may follow step 510, but step 520 may follow step 530. Alternatively, the method may include only one of steps 520 and 530. The subsequent steps may also have similar considerations.

Figure 6:
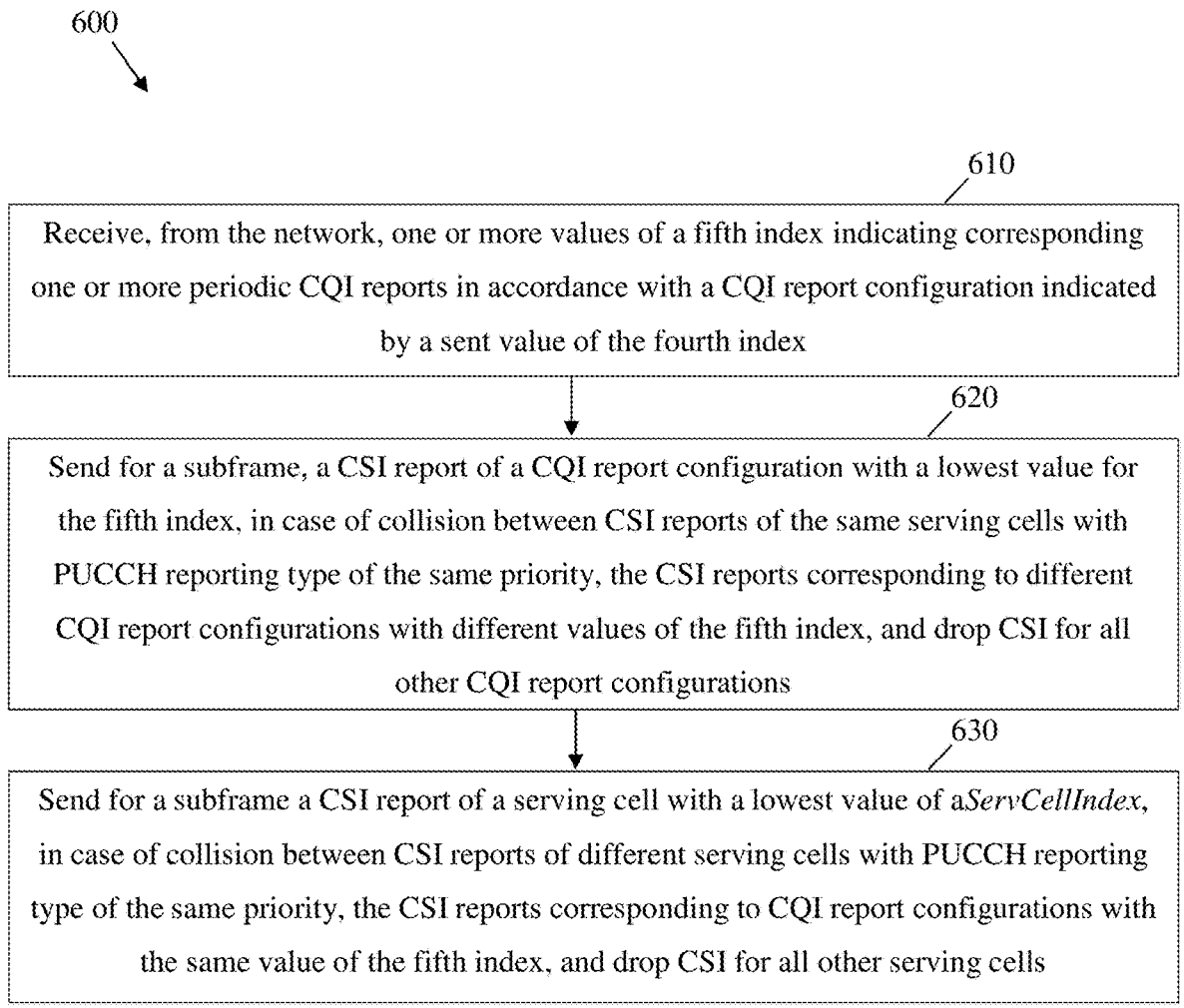
FIG. 6 illustrates another embodiment method by a UE for CSI feedback according to indicated reference signals.

FIG. 6 illustrates another embodiment method 600 by the UE for CSI feedback according to indicated reference signals. The method 600 after step 510 of the method 500. At step 610, the UE receives, from the network, one or more values of a fifth index indicating corresponding one or more periodic CQI reports in accordance with a CQI report configuration indicated by a previously sent value of the fourth index. At step 620, the UE sends back for a subframe, a CSI report of a CQI report configuration with a lowest value for the fourth index, in case of collision between CSI reports of the same serving cells with PUCCH reporting type of the same priority, and the CSI reports corresponding to different CQI report configurations with different values of the fourth index, and the UE drops CSI for all other CQI report configurations. At step 630, the UE sends back for a subframe a CSI report of a serving cell with a lowest value of ServCellIndex, in case of collision between CSI reports of different serving cells with PUCCH reporting type of the same priority, and the CSI reports corresponding to CQI report configurations with the same value of the fourth index, and the UE drops CSI for all other serving cells. No specific time order for steps 620 and 630 is specified in the method 600. In other embodiments, at least some of the steps in the method 600 can be implemented in a different order. Further, other embodiment methods by the UE for CSI feedback according to indicated reference signals may include only some of the steps above. For example, steps 620 and 630 may follow step 610, but step 620 may follow step 630. Alternatively, the method may include only one of steps 620 and 630. The subsequent steps may also have similar considerations.

Figure 7:
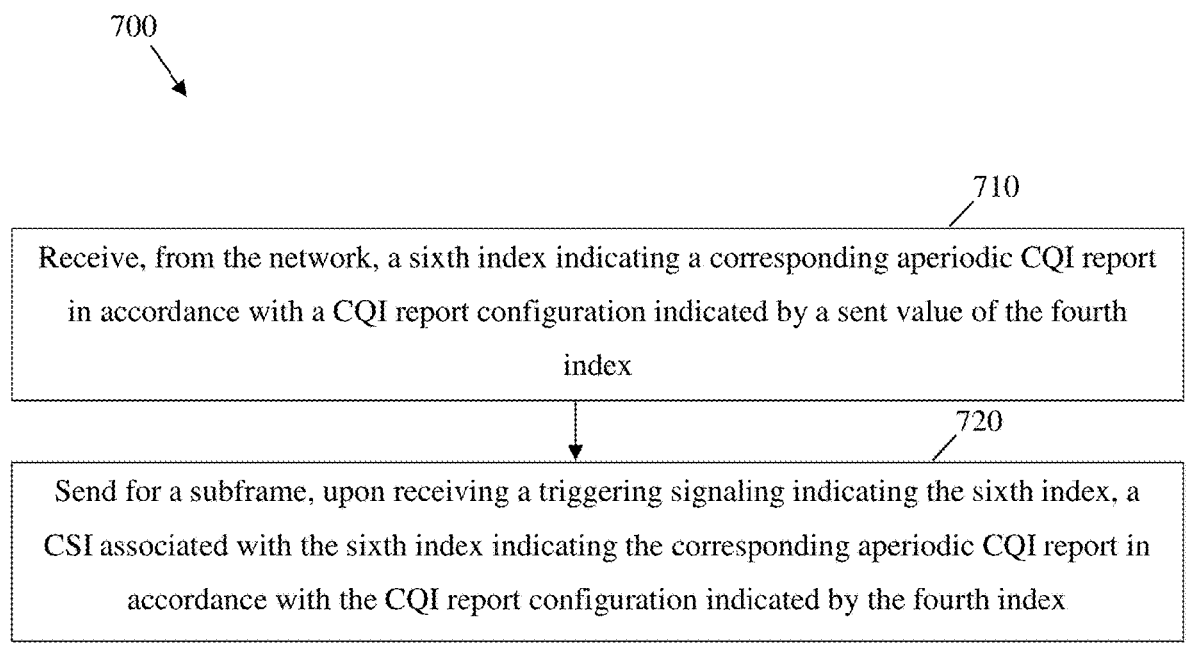
FIG. 7 illustrates another embodiment method by a UE for CSI feedback according to indicated reference signals.

FIG. 7 illustrates another embodiment method 600 by the UE for CSI feedback according to indicated reference signals. The method 700 after step 510 of the method 500. At step 710, the UE receive, from the network, a sixth index indicating a corresponding aperiodic CQI report in accordance with a CQI report configuration indicated by a previously sent value of the fourth index. At step 720, the UE sends back for a subframe, upon receiving a triggering signaling indicating the sixth index, a CSI associated with the sixth index indicating the corresponding aperiodic CQI report in accordance with the CQI report configuration indicated by the fourth index.

Figure 8:
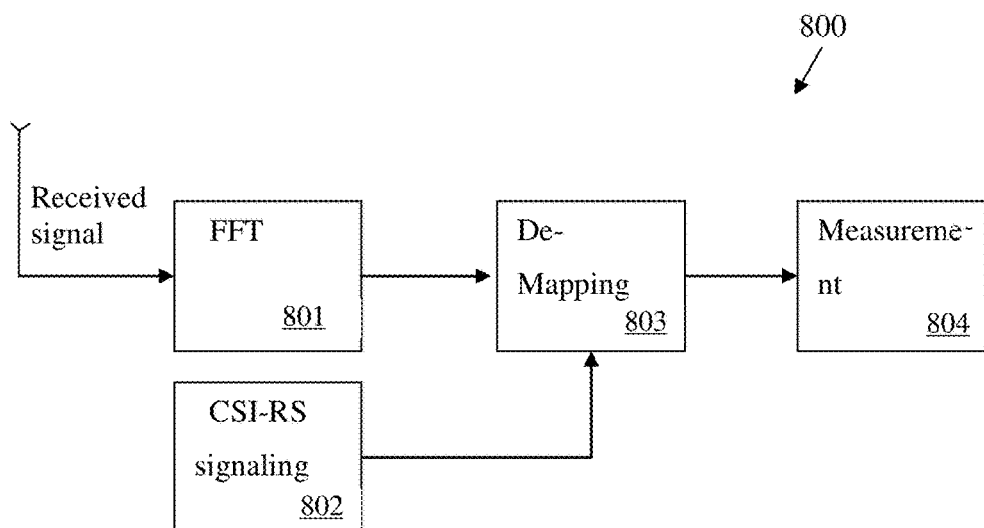
FIG. 8 illustrates an embodiment reception method.

FIG. 8 illustrates an embodiment reception method 800 that can be implemented at a UE as part of or to support the reference signals and CSI Feedback schemes and methods above. At step 801, the received signal (at the UE side) is transformed by FFT, and then turned into a frequency domain signal per OFDM symbol. At step 802, the UE decodes the signaling from the eNB to obtain the CSI-RS. Using this information, de-mapping is implemented at step 803 to obtain the CSI-RS signal. At step 804, this CSI-RS signal is used for channel estimation and measurement, where the CSI-RS signal is estimated based on the CSI-RS signal.

Figure 9:
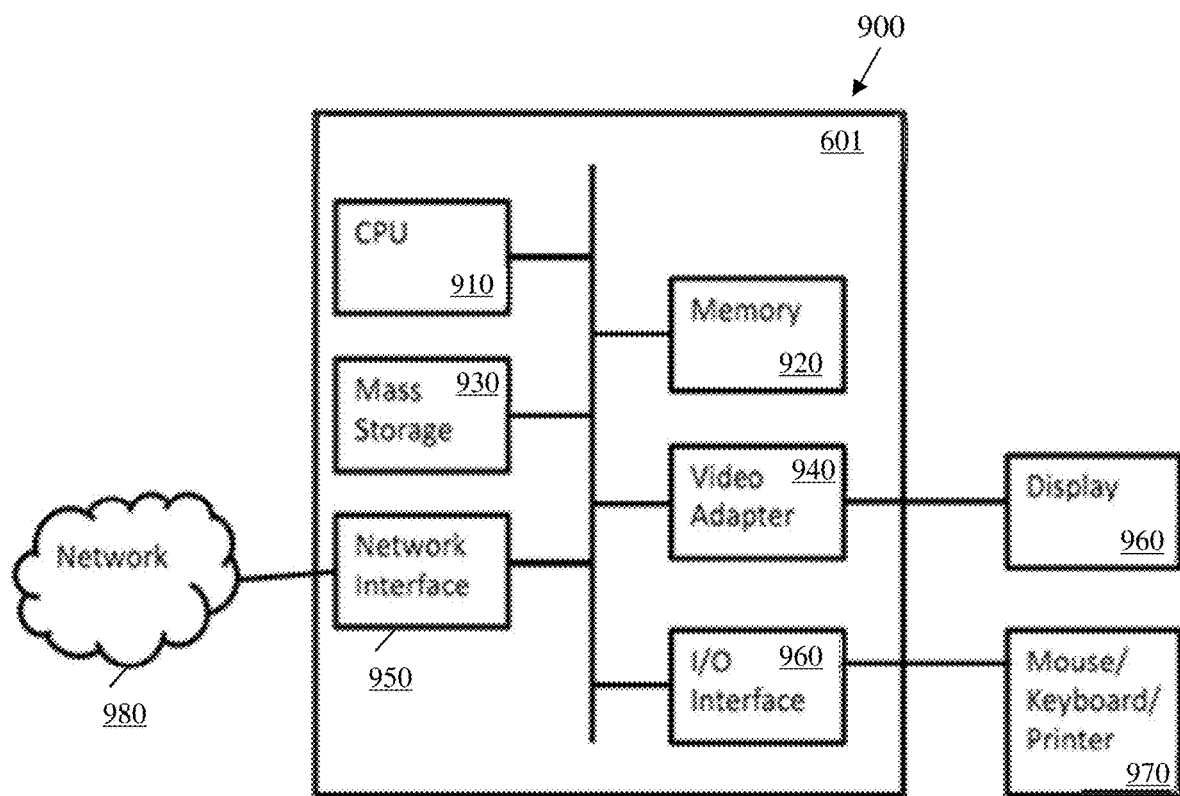
FIG. 9 is a block diagram of a processing system that can be used to implement various embodiments.

FIG. 9 is a block diagram of a processing system 900 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 900 may comprise a processing unit 901 equipped with one or more input/output devices, such as a speaker, microphone, mouse, touchscreen, keypad, keyboard, printer, display, and the like. The processing unit 901 may include a central processing unit (CPU) 910, a memory 920, a mass storage device 930, a video adapter 940, and an I/O interface 950 connected to a bus. The bus may be one or more of any type of several bus architectures including a memory bus or memory controller, a peripheral bus, a video bus, or the like.

The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs. The mass storage device 930 may comprise any type of storage device configured to store data, programs, and other information and to make the data, programs, and other information accessible via the bus. The mass storage device 930 may comprise, for example, one or more of a solid state drive, hard disk drive, a magnetic disk drive, an optical disk drive, or the like.

The video adapter 940 and the I/O interface 960 provide interfaces to couple external input and output devices to the processing unit. As illustrated, examples of input and output devices include a display 960 coupled to the video adapter 940 and any combination of mouse/keyboard/printer 970 coupled to the I/O interface 960. Other devices may be coupled to the processing unit 901, and additional or fewer interface cards may be utilized. For example, a serial interface card (not shown) may be used to provide a serial interface for a printer.

The processing unit 901 also includes one or more network interfaces 950, which may comprise wired links, such as an Ethernet cable or the like, and/or wireless links to access nodes or one or more networks 980. The network interface 950 allows the processing unit 901 to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, by a user equipment (UE) for wireless communications, the method comprising:
receiving, from a network, a first set of first indexes that each indicates a corresponding non-zero-power channel-state information (CSI) reference signal (CSI-RS) resource, a second set of second indexes that each indicates a corresponding zero-power CSI-RS resource, a third set of third indexes that each indicates a corresponding CSI interference measurement (CSI-IM) resource, and a fourth set of fourth indexes that each indicates a corresponding report configuration;
performing an interference measurement according to at least one report configuration of the report configurations indicated by the fourth set of indexes, wherein the at least one report configuration is associated with:
in response to a channel measurement resource and an interference measurement resource being configured for the at least one report configuration by the network, at least one of a subset of the non-zero-power CSI-RS resources indicated by the first indexes and a subset of the CSI-IM resources indicated by the third indexes;
and in response to only the channel measurement resource being configured for the at least one report configuration by the network, only a subset of the non-zero-power CSI-RS resources indicated by the first indexes;
and reporting a CSI to the network according to the interference measurement.

2. The method of claim 1 further comprising:
performing rate matching around resource elements (REs) associated with the non-zero-power CSI-RS resource corresponding to the first indexes for physical downlink shared channel (PDSCH) demodulation.

3. The method of claim 1 further comprising:
performing rate matching around resource elements (REs) associated with the zero-power CSI-RS resource corresponding to the second indexes for physical downlink shared channel (PDSCH) demodulation.

4. The method of claim 1, wherein the UE receives a signaling that includes, for the report configurations corresponding to the fourth indexes, the first indexes to configure the non-zero-power CSI-RS resource corresponding to the indicated first indexes as one of a signal or channel measurement resource and an interference measurement resource associated with the respective report configuration.

5. The method of claim 1, wherein the UE receives a signaling that includes, for the report configurations corresponding to the fourth indexes, the third indexes to configure the CSI-RS resource corresponding to the indicated third indexes as an interference measurement resource associated with the respective report configuration.

6. The method of claim 1, wherein the non-zero-power CSI-RS resource, the zero-power CSI-RS resource, the CSI-IM resource, and the report configuration are selected by the network from a maximum number of non-zero-power CSI-RS resources, a maximum number of zero-power CSI-RS resources, a maximum number of CSI-IM resources, and a maximum number of report configurations that are specified for the UE or according to a communications protocol of the network.

7. The method of claim 1, wherein the indicated non-zero-power CSI-RS resource is associated with one or more Pc ratio values, the P, ratio values being assumed ratios of physical downlink shared channel (PDSCH) energy per resource element (EPRE) to CSI-RS EPRE.

8. The method of claim 7 further comprising deriving, using the indicated nonzero-power CSI-RS resource, one or more CQI reports assuming each of the one or more Pc ratio values, according to one or more CQI report configurations corresponding to one or more values of the fourth indexes.

9. The method of claim 1 further comprising:
receiving, from a network, a sixth set of sixth indexes that each indicates a corresponding aperiodic CSI report in accordance with the report configurations indicated by the fourth indexes.

10. The method of claim 9, wherein the sixth indexes indicating the corresponding aperiodic CSI reports have values from a plurality of values for the sixth indexes indicating corresponding aperiodic CSI reports, and wherein a maximum number of the values for the sixth indexes is specified for the UE.

11. The method of claim 10, wherein the maximum number of the values for the sixth indexes is equal to three.

12. The method of claim 1, wherein each configured value of the first indexes is different from any other configured value of the first indexes at the same time, each configured value of the second indexes is different from any other configured value of the second indexes at the same time, each configured value of the third indexes is different from any other configured value of the third indexes at the same time, and each configured value of the fourth indexes is different from any other configured value of the fourth indexes at the same time.

13. The method of claim 1, wherein the UE receives a signaling that indicates the first indexes to specify that the non-zero-power CSI-RS resources corresponding to the indicated first indexes are released.

14. The method of claim 1, wherein the UE receives a signaling that indicates a value of the second indexes for specifying that the zero-power CSI-RS resources corresponding to the indicated second indexes are released.

15. The method of claim 1, wherein the UE receives a signaling that indicates a value of the third indexes for specifying that the CSI-RS resource corresponding to the indicated third indexes are released.

16. The method of claim 1, wherein the UE receives a signaling that indicates a value of the fourth indexes for specifying that the corresponding report configurations corresponding to the indicated fourth indexes are released.

17. The method of claim 1, wherein the corresponding CSI-RS resources, the corresponding report configurations, or both are associated with corresponding pre-defined index values according to an ordering of signaled resources or configurations.

18. The method of claim 1, wherein the corresponding CSI-RS resources, the corresponding report configurations, or both are assigned with corresponding indexes.

19. The method of claim 1, further comprising: performing a channel quality measurement;
and sending, by the UE, channel quality feedback in accordance with the received first, second, third and fourth indexes and the channel quality measurement.

20. The method of claim 1, wherein the first, second, third, and fourth indexes are different from each other.

21. A method, by a user equipment (UE) for wireless communications, the method comprising:
receiving, from a network, a fourth set of fourth indexes that each indicates a corresponding report configuration, at least one report configuration indicating a first index of a non-zero-power channel-state information (CSI) reference signal (CSI-RS) resource configured by the network and a second index of a CSI interference measurement (CSI-IM) resource configured by the network;
and receiving, from the network, a fifth set of fifth indexes that each indicates a corresponding periodic report in accordance with the report configurations indicated by the fourth indexes, the corresponding periodic report associated with the first index and the second index.

22. The method of claim 21 further comprising:
sending for a subframe to the network, a CSI report of a report configuration with a lowest value for the fourth indexes, in case of collision between CSI reports of the same serving cell with Physical Uplink Control Channel (PUCCH) reporting type of the same priority, and the CSI reports corresponding to different report configurations with different values of the fourth indexes;
and dropping CSI for all other report configurations.

23. The method of claim 21 further comprising:
sending for a subframe to the network, a CSI report of a serving cell with a lowest value of ServCellIndex, in case of collision between CSI reports of different serving cells with Physical Uplink Control Channel (PUCCH) reporting type of the same priority, and the CSI reports corresponding to CQI report configurations with the same value of the fourth indexes;
and dropping CSI for all other serving cells.

24. The method of claim 21 further comprising:
sending for a subframe to the network, a CSI report of a report configuration with a lowest value of the fourth indexes and of a serving cell with a report configuration with the lowest value of the fourth indexes, in case of collision between CSI reports of different serving cells with Physical Uplink Control Channel (PUCCH) reporting type of the same priority, and the CSI reports corresponding to report configurations with different values of the fourth indexes;
and dropping CSI for all other serving cells and report configurations with all other values of the fourth indexes.

25. A method, by a user equipment (UE) for wireless communications, the method comprising:
receiving, from a network, a fourth set of fourth indexes that each indicates a corresponding report configuration, at least one report configuration indicating a first index of a non-zero-power channel-state information (CSI) reference signal (CSI-RS) resource configured by the network and a second index of a CSI interference measurement (CSI-IM) resource configured by the network;
receiving, from the network, a sixth set of sixth indexes that each indicates a corresponding aperiodic report in accordance with the report configurations indicated by the fourth indexes, the corresponding aperiodic report associated with the first index and the second index;
and sending for a subframe to the network, upon receiving a triggering signaling indicating one of the sixth index, a CSI associated with the indicated sixth index indicating the corresponding aperiodic report associated with the indicated sixth index in accordance with the report configuration associated with the indicated sixth index.

26. A method, by a network component for configuring a user equipment (UE) for wireless communications, the method comprising:

transmitting, to the UE, a first set of first indexes that each indicates a corresponding non-zero-power channel-state information (CSI) reference signal (CSI-RS) resource, a second set of second indexes that each indicates a corresponding zero-power CSI-RS resource, a third set of third indexes that each indicates a corresponding CSI interference measurement (CSI-IM) resource, and a fourth set of fourth indexes that each indicates a corresponding report configuration;

configuring a channel measurement resource and an interference measurement resource for the UE, wherein at least one report configuration of the report configurations indicated by the fourth set of indexes is associated with a subset of the non-zero-power CSI-RS resources indicated by the first indexes and a subset of the CSI-IM resources indicated by the third indexes;

and receiving a CSI from the UE.

27. The method of claim 26, wherein a CSI-RS resource, a CQI report, or both is associated with a corresponding pre-defined index value or order of resources or reports.

28. The method of claim 26, wherein a CSI-RS resource, a CQI report, or both is associated with a corresponding index value, bit, or bitmap.

29. The method of claim 26, wherein the non-zero-power CSI-RS resource, the zero-power CSI-RS resource, the CSI-RS resource for interference measurement, and a CQI report are selected by the network from a maximum number of non-zero-power CSI-RS resources, a maximum number of zero-power CSI-RS resources, a maximum number of CSI-RS resources for interference measurements, and a maximum number of CQI reports that are predetermined for the UE.

30. The method of claim 26, wherein the indicated non-zero-power CSI-RS resource is signaled with one or more allowable Pc ratio values, the Pr ratio values being assumed ratios of physical downlink shared channel (PDSCH) energy per resource element (EPRE) to CSI-RS EPRE.

31. A user equipment (UE) for wireless communications, the UE comprising: a processor;

and a non-transitory computer readable storage medium storing programming for execution by the processor, the programming including instructions to:

receive, from a network, a first set of first indexes that each indicates a corresponding non-zero-power channel-state information (CSI) reference signal (CSI-RS) resource, a second set of second indexes that each indicates a corresponding zero-power CSI-RS resource, a third set of third indexes that each indicates a corresponding CSI interference measurement (CSI-IM) resource, and a fourth set of fourth indexes that each indicates a corresponding report configuration;

perform an interference measurement according to at least one report configuration of the report configurations indicated by the fourth set of indexes, wherein the at least one report configuration is associated with:

in response to a channel measurement resource and an interference measurement resource being configured for the at least one report configuration by the network, at least one of a subset of the non-zero-power CSI-RS resources indicated by the first indexes and a subset of the CSI-IM resources indicated by the third indexes;

and in response to only the channel measurement resource being configured for the at least one report configuration by the network, only a subset of the non-zero-power CSI-RS resources indicated by the first indexes;

and report a CSI to the network according to the interference measurement.

32. The UE of claim 31, wherein a CSI-RS resource, a CQI report, or both is associated with a corresponding pre-defined index value or order of resources or reports.

33. The UE of claim 31, wherein a CSI-RS resource, a CQI report, or both is associated with a corresponding index value, bit, or bitmap.

34. A network component for configuring a user equipment (UE) for wireless communications, the network component comprising:

a processor;

and a non-transitory computer readable storage medium storing programming for execution by the processor, the programming including instructions to:

transmit, to the UE, a first set of first indexes that each indicates a corresponding non-zero-power channel-state information (CSI) reference signal (CSI-RS) resource, a second set of second indexes that each indicates a corresponding zero-power CSI-RS resource, a third set of third indexes that each indicates a corresponding CSI interference measurement (CSI-IM) resource, and a fourth set of fourth indexes that each indicates a corresponding report configuration;

configure a channel measurement resource and an interference measurement resource for the UE, wherein at least one report configuration of the report configurations indicated by the fourth set of indexes is associated with a subset of the non-zero-power CSI-RS resources indicated by the first indexes and a subset of the CSI-IM resources indicated by the third indexes;

and receive a CSI from the UE.

35. The network component of claim 34, wherein a CSI-RS resource, a CQI report, or both is associated with a corresponding pre-defined index value or order of resources or reports.

36. The network component of claim 34, wherein a CSI-RS resource, a CQI report, or both is associated with a corresponding index value, bit, or bitmap.

37. The network component of claim 34, wherein the non-zero-power CSI-RS resource, the zero-power CSI-RS resource, the CSI-RS resource for interference measurement, and a CQI report are selected by a network from a maximum number of non-zero-power CSI-RS resources, a maximum number of zero-power CSI-RS resources, a maximum number of CSI-RS resources for interference measurements, and a maximum number of CQI report configurations that are specified for the UE.

* * * * *

UNITED STATES PATENT AND TRADEMARK OFFICE
CERTIFICATE OF CORRECTION

PATENT NO. : 10,750,396 B2
APPLICATION NO. : 15/978444
DATED : August 18, 2020
INVENTOR(S) : Liu et al.

Page 1 of 1

It is certified that error appears in the above-identified patent and that said Letters Patent is hereby corrected as shown below:

In the Claims

In Column 21, Line 3, Claim 7, delete "Pc ratio values, the P, ratio values being assumed" and insert --$P_c$ ratio values, the $P_c$ ratio values being assumed--.

In Column 21, Line 9, Claim 8, delete "Pc ratio" and insert --$P_c$ ratio--.

In Column 23, Line 38, Claim 30, delete "Pc ratio values, the Pr ratio values being assumed" and insert --$P_c$ ratio values, the $P_c$ ratio values being assumed--.

Signed and Sealed this
Third Day of November, 2020

Andrei Iancu
*Director of the United States Patent and Trademark Office*